United States Patent [19]
Abrams

[11] 3,902,794
[45] Sept. 2, 1975

[54] FRESNELL LENS

[76] Inventor: Eugene Abrams, One Swale Rd., Franklin Square, N.Y. 11010

[22] Filed: Jan. 2, 1974

[21] Appl. No.: 430,187

[52] U.S. Cl............. 350/294; 350/162 ZP; 350/211
[51] Int. Cl.² ........................................... G02B 5/10
[58] Field of Search...... 350/162 ZP, 211, 293, 294, 350/299

[56] References Cited
UNITED STATES PATENTS

| | | | |
|---|---|---|---|
| 3,523,721 | 8/1970 | Hofmann | 350/211 |
| 3,614,193 | 10/1971 | Beiser | 350/162 ZP |
| 3,705,308 | 12/1972 | Lehovec | 350/162 ZP |
| 3,735,685 | 5/1973 | Plummer | 350/211 |

OTHER PUBLICATIONS

Boettner, Design and Construction of Fresnel Optics for Photoelectric Receivers, JOS A, Vol. 41, No. 11, Nov. 1951, pp. 849–857.

*Primary Examiner*—Alfred E. Smith
*Assistant Examiner*—Michael J. Tokar
*Attorney, Agent, or Firm*—Bauer & Amer

[57] ABSTRACT

A fresnell lens that differs from known technology in that it reflects, rather than transmits, light to its principal focus, thereby facilitating removal of the thermal energy from the actinic light impinging upon the lens, as well as providing numerous other advantages for the lens.

1 Claim, 4 Drawing Figures

PATENTED SEP 2 1975

3,902,794

FRESNELL LENS

The present invention relates generally to the construction and performance of a fresnell lens, and more particularly to improvements for a fresnell lens which significantly increases its utility.

Underlying the present invention is the recognition that the optical surface of a fresnell lens which achieves a lightpath-modifying function and causes, for example, impinging sunlight to converge to an image of the sun at the lens principal focus, can also be made to reflect said impinging sunlight to a principal focus on the same side of the lens as its sunlight intercepting surface. This conversion of the fresnell lens from a sunlight-transmitting to a sunlight-reflecting device facilitates its use in many areas; one notable area being in the use of sunlight to produce electricity. In the direct conversion of sunlight to electricity, use is made of silicon solar cells, which are known to have a low capacity to withstand and properly function at excessive temperatures. The use of the improved fresnell lens hereof, however, readily enables the separation of the thermal energy from the sunlight, so that only the actinic light of the sunlight is passed on to the solar cells. The improvements applied to the fresnell lens according to the present invention also contribute to providing the lens with a sun-tracking capability.

Broadly, it is an object of the present invention to improve the fresnell lens so that its range of uses is significantly increased, i.e., to overcome in a typical prior art fresnell lens the thermal and actinic light transmission thereof, as well as other shortcomings, which restrict its use. Specifically, it is an object to modify a fresnell lens so that sunlight impinging thereon is transmitted to a thermal energy removal station prior to transmission to the end-use station or location, thus enhancing use of the lens for solar energy purposes.

One embodiment of a fresnell lens demonstrating objects and advantages of the present invention has a planar body with a light-intercepting surface on one side thereof and a lightpath-converging configuration of grooves and ridges formed in said surface. Additionally, it is improved by having a light-reflecting surface adhered to the light-intercepting surface which, in connection with the sunlight impinging on the light-intercepting surface, is effective in reflecting the same therefrom into a converging image of the sun at the principal focus of the lens which is located on the same side thereof as the light-intercepting surface. Prior to transmission of the reflected sunlight to the end-use location, it is processed appropriately for use at that location.

In another embodiment of the improved fresnell lens hereof the sunlight reflecting grooves and ridges of the light-intercepting surface are related to different sun positions, so that collectively these grooves and ridges cooperate to provide a sun-tracking function without the need to change the azimuth or orientation of the lens relative to the sun.

The above brief description, as well as further objects, features and advantages of the present invention, will be more fully appreciated by reference to the following detailed description of presently preferred, but nonetheless illustrative embodiments in accordance with the present invention, when taken in conjunction with the accompanying drawings, wherein.

Figure 1:
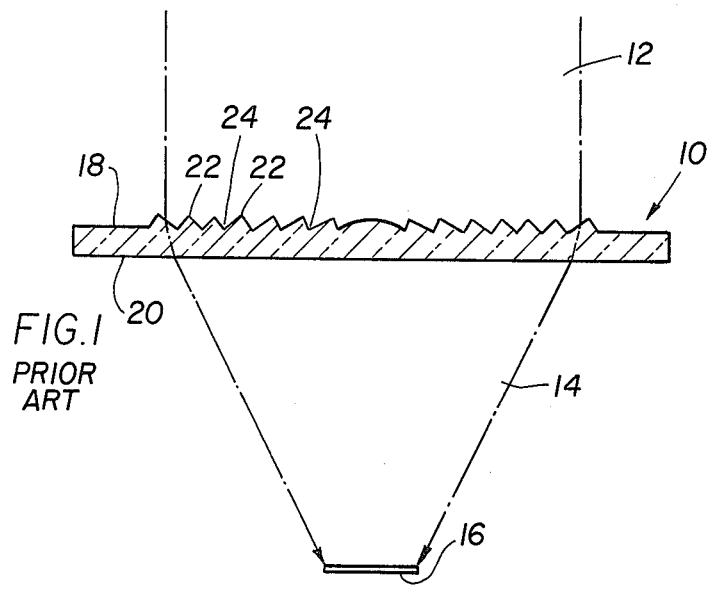
FIG. 1 is a diagramatic view, in side elevational view, of a conventional light-transmitting fresnell lens.

In FIG. 1 there is illustrated a conventional fresnell lens, generally designated 10, that is used, as generally understood, in causing sunlight 12 impinging upon it to exit in a conical concentrated form 14 so as to produce an image of the sun at the principal focus of the lens, as at 16. The fresnell lens 10 of FIG. 1 is commercially available from many sources, one suitable source being Edmund Scientific Co., of Barrington, New Jersey. The commercial embodiment which is available from this firm and which is exemplified by the fresnell lens 10 of FIG. 1 is approximately 11-⅞ inches square and has a focal length of approximately 13-½ inches.

As further generally understood, lens 10 is generally planar in shape, having a light-intercepting surface 18 on one side, and a smooth exiting surface 20 on the opposite side. In surface 18, there is an arrangement of concentric ridges 22 bounding grooves 24, which cooperate to provide a lightpath-converging configuration which, in a well understood manner, causes the convergence in the impinging sunlight 12 so that the exiting configuration is a conical shape 14, as illustrated in FIG. 1.

Figure 2:
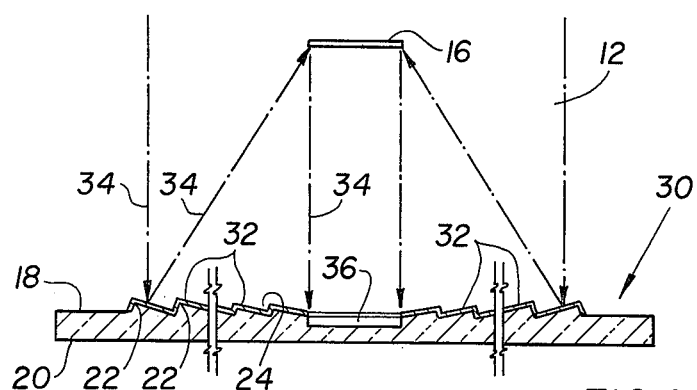
FIG. 2 is a view similar to FIG. 1, but illustrating a modified version thereof which constitutes a first embodiment of the present invention.

Reference should now be made to FIG. 2 wherein there is shown an improved fresnell lens 30 according to the present invention. The structural features of lens 30 which are similar to those embodied in the prior art lens 10 are indicated by being identified by the same reference numeral. By a comparison of FIGS. 1 and 2, it should therefore be readily apparent that lens 30 does not transmit the sunlight 12 impinging on the surface 18, but rather reflects the same to a principal focus 16 which is on the same side of the lens as said surface 18. This is achieved by utilizing the well known technique employed in the construction of a fresnell lens of creating an optical surface in a flat plane. In this instance, the optical surface is a parabala, and the same is optically folded into the ridge and groove configuration 22, 24. To said optically folded parabala surface, or more particularly the contour or configuration thereof, there is appropriately applied a reflecting surface 32. This can be done, for example, using a high vacuum evaporator, such as is commercially available from Veeco Instrument, Inc. of Plainview, New York. As a consequence, and as exemplified by the tracing of ray 34, said ray 34 initially impinges on the mirrored or reflecting surface 32 and instead of being transmitted through the body of the lens, it is reflected along the same altered or modified path up to the principal focus 16 which is now on the same side as the surface 18. Assuming further that at the principal focus there is a reflecting member, also denoted by the reference numeral 16, ray 34 is directed back to a location 36 centrally of the lens 30 and in the same plane as the light-intercepting surface 18. At location or station 36, the sunlight 34 can be effectively utilized in any number of ways, one such way being to energize silicon solar cells (not shown) so as to produce electricity therefrom.

Figure 3:
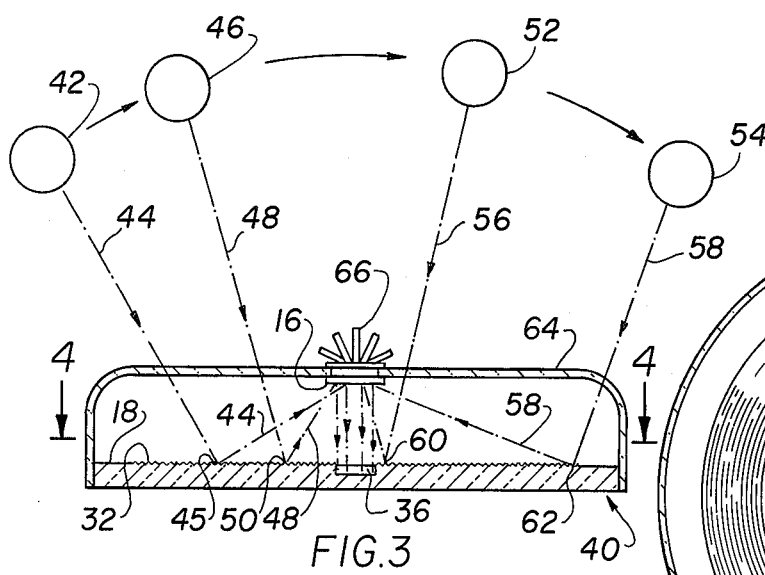
FIG. 3 is a side elevational view, in section, illustrating a second embodiment of an improved fresnell lens according to the present invention which has a sun-tracking capability.
Figure 4:
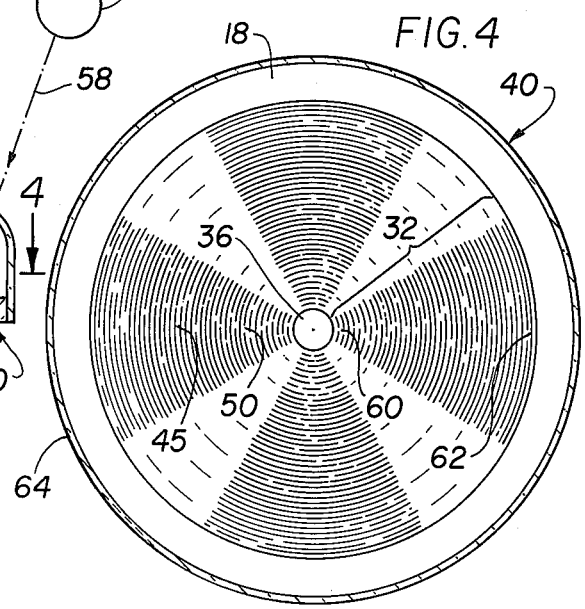
FIG. 4 is a plan view projected from FIG. 3 showing further details of said improved sun-tracking fresnell lens.

FIGS. 3 and 4, to which reference is now made, illustrate a second embodiment of a fresnell lens according to the present invention. Lens 40 illustrated in these figures will be understood to have a reflecting function as described in connection with FIG. 2, rather than the prior art conventional transmitting function as described in connection with FIG. 1. In addition, lens 40 has a sun-tracking capability, without movement or reliance on a sun-tracking mechanism, all as will now be described in detail. To this end, there is a significant modification embodied in the reflecting groove and ridge configuration 32 of the sunlight-intercepting surface 18 thereof. This modification consists of correlating a selected number of the grooves and ridges to a cooperating position of the sun. By way of example, sun position 42 produces a directional sunlight ray 44 which will impinge upon a lightpath-reflecting configuration 45 that is so designed to reflect ray 44 to the reflector 16 so that it is reflected therefrom to the lens station 36, all as illustrated in FIG. 3. It will be understood, of course, that there are enough reflecting ridges and grooves of appropriate configuration and design to produce the same result as configuration 45 so that a total number of sunlight rays 44 are available in sun position 42 to, in turn, provide a sufficient amount and extent of sunlight flux at the station 36.

When the sun next moves to position 46, it is contemplated that ray 48 from this sun position will impinge upon a different reflecting configuration 50 which, however, like configuration 45, is effective in redirecting ray 48 to the reflecting member 16 which ultimately results in it being available at station 36.

For completeness sake, it is to be noted that in additional sun positions 52, 54, and possibly others (not shown), that there will respectively be rays 56, 58 that will be reflected by appropriately designed configurations 60 and 62 to the elevated, centrally located reflecting member 16.

Completing the construction of the lens 40 is a clear plastic closure 64 disposed in covering relation over the planar body of the lens 40. The surface of the closure 64 is advantageously used as a support for the reflecting member 16 to maintain the same in its clearance position in facing relation to the station 36, so that it can reflect sunlight to the said station.

It should be readily apparent that the design of the reflecting surface 32 of the improved sun-tracking fresnell lens 40 is readily capable of being determined by computer calculation using conventional ray-tracing techniques. However, while these calculations are conventional, it is not conventional to have embodied in the lens 40 a sun-tracking capability wherein different selected cooperating grooves and ridges, as exemplified by those denoted by the reference numerals 45, 50, 60 and 62, are adapted to transmit impinging sunlight thereon as a converging image of the sun to the principal focus 16 of the lens according to a cooperating sun position, as hereinbefore described.

In a typical commercial embodiment of the lens 40, it is contemplated that as many as seven sun positions can be accommodated, thus requiring seven corresponding lightpath-altering segments in the lens 40. The grooves and ridges of these segments can be in adjacent relation so that each segment is differentiated from the other, or alternatively different grooves and ridges can be interleaved and interspaced with each other occurring, for example, at every seventh groove and ridge. The compromise of a sun-tracking lens 40 according to the present invention is that it requires a greater size than a fresnell lens not having this function, but this shortcoming is more than outweighed by the advantage of having the capability of relating to changing positions of the sun without changing the azimuth orientation of the lens 40 by sun-tracking mechanisms or the like.

Another advantage possessed by both of the reflecting fresnell lenses 30 and 40 according to the present invention resides in the ease in which the thermal heat of the sunlight can be dissipated. Specifically, as illustrated in connection with FIG. 3, because the sunlight impinging on the light-intercepting surface 18 is reflected therefrom to the reflecting member 16 and from thence to the station 36, the intermediate station at the reflecting member 16 can be advantageously used in separating out the thermal content of the sunlight. That is, only the actinic light of the sunlight is reflected to the station 36. To dissipate this thermal content, which may be as high as 2000° F. is a heat-dissipating means or device 66. Device 66 may be any one of several readily commercially available heat sinks. One such heat sink is that which is commercially available from Tran-Pec Corporation of Columbus, Nebraska. Alternatively, use may be made of a dicroic mirror as the member 16 which, in a well understood manner, is effective in reflecting actinic light and in transmitting radiant thermal energy.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. In a fresnell lens of the type having a planar body with a light-intercepting surface on one side thereof and a lightpath-converging configuration of grooves and ridges formed in said surface, the improvement thereto comprising different selected cooperating grooves and ridges in said light-intercepting surface adapted to transmit impinging sunlight thereon as a converging image of the sun to a principal focus of said lens in a selected one of plural positions of the sun relative to said lens for tracking said sun without movement of said lens, a light-reflecting surface adhered to said light-intercepting surface having a configuration conforming to that of said grooves and ridges of said surface so that sunlight impinging on said light-intercepting surface is reflected therefrom to said principal focus of said lens located on the same side as said light-intercepting surface, a reflecting member supported in a clearance position above said light-intercepting surface at the principal focus of said lens so that the reflected sunlight from said light-intercepting surface is reflected back to a central location in the plane of said light-intercepting surface, heat dissipating means in heat transfer relation to said reflecting member so that said sunlight reflected back to said central location on said light-intercepting surface is of an optimum reduced temperature, and a light-transmitting protective closure member in covering relation over said lens, said reflecting member being supported on said closure member in facing relation to the light-intercepting surface of said lens.

* * * * *